United States Patent
Wang et al.

(10) Patent No.: US 8,145,272 B2
(45) Date of Patent: Mar. 27, 2012

(54) PILOT-BASED TWO-DIMENSIONAL CHANNEL ESTIMATION

(75) Inventors: Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 12/182,238

(22) Filed: Jul. 30, 2008

(65) Prior Publication Data

US 2009/0042530 A1 Feb. 12, 2009

Related U.S. Application Data

(60) Provisional application No. 60/954,753, filed on Aug. 8, 2007.

(51) Int. Cl.
*H04M 1/00* (2006.01)

(52) U.S. Cl. ............... 455/562.1; 455/62; 455/67.11; 455/185.1; 375/260

(58) Field of Classification Search ............... 455/562.1, 455/62, 67.11, 185.1, 231, 60, 119; 375/260, 375/259; 370/260, 343, 347
See application file for complete search history.

(56) References Cited

U.S. PATENT DOCUMENTS

| | | | |
|---|---|---|---|
| 6,961,364 | B1 | 11/2005 | Laroia et al. |
| 7,388,979 | B2 * | 6/2008 | Sakai et al. ............ 382/149 |
| 7,389,086 | B2 | 6/2008 | Toda et al. |
| 7,733,989 | B2 | 6/2010 | Guey |
| 7,778,211 | B2 * | 8/2010 | Hedayat et al. ............ 370/310 |
| 7,792,352 | B2 * | 9/2010 | Sakai et al. ............ 382/149 |
| 2003/0043732 | A1 | 3/2003 | Walton et al. |
| 2003/0123559 | A1 | 7/2003 | Classon et al. |
| 2005/0147287 | A1 * | 7/2005 | Sakai et al. ............ 382/141 |

(Continued)

FOREIGN PATENT DOCUMENTS

EP 1936901 A2 6/2008

OTHER PUBLICATIONS

Xiaodai Dong et al, "Linear Interpolation in Pilot Symbol Assisted Channel Estimation for OFDM," IEEE Transactions on Wireless Communications, vol. 6, No. 5, May 1, 2007, pp. 1910-1920.

(Continued)

*Primary Examiner* — Minh D Dao
(74) *Attorney, Agent, or Firm* — Edell, Shapiro & Finnan, LLC

(57) ABSTRACT

Techniques are provided herein to estimate channel information based a received burst that is comprises of consecutive transmissions. Each transmission comprises a plurality of data subcarriers and a plurality of pilot subcarriers on a radio frequency (RF) channel, wherein locations of the pilot subcarriers in the consecutive transmissions are different. Channel information at the pilot subcarriers is computed for each transmission in the burst. A time variation parameter and a frequency variation parameter of the channel for the burst are computed using the channel information at the pilot subcarriers for the transmissions in the burst. Channel information for at least one data subcarrier of a transmission in the burst is computed by interpolation and/or extrapolation of the channel information at the pilot subcarriers using the time variation parameter and the frequency variation parameter. The channel information for the remaining data subcarriers is computed by interpolation and/or extrapolation using the estimated channel information at the pilot subcarriers and the at least one data subcarrier.

20 Claims, 6 Drawing Sheets

U.S. PATENT DOCUMENTS

| | | | |
|---|---|---|---|
| 2006/0203932 A1 | 9/2006 | Palanki et al. | |
| 2006/0280262 A1 | 12/2006 | Malladi | |
| 2007/0041311 A1 | 2/2007 | Baum et al. | |
| 2008/0049814 A1 | 2/2008 | Jeon | |
| 2008/0076477 A1* | 3/2008 | Hedayat et al. | 455/562.1 |
| 2008/0101489 A1* | 5/2008 | Wang et al. | 375/260 |
| 2008/0123516 A1 | 5/2008 | Anderson et al. | |
| 2008/0159455 A1 | 7/2008 | Wang et al. | |
| 2008/0165901 A1 | 7/2008 | Krupka | |
| 2008/0232674 A1* | 9/2008 | Sakai et al. | 382/149 |
| 2009/0116592 A1* | 5/2009 | Namba et al. | 375/344 |
| 2010/0130135 A1* | 5/2010 | Wang et al. | 455/67.11 |
| 2010/0157861 A1* | 6/2010 | Na et al. | 370/310 |
| 2010/0166118 A1 | 7/2010 | Mantravadi et al. | |
| 2010/0328446 A1* | 12/2010 | Sakai et al. | 348/126 |

OTHER PUBLICATIONS

Mehmet Kemal Ozdemir et al., "Channel Estimation for Wireless OFDM Systems," IEEE Communications Surveys, vol. 9, No. 2, Apr. 1, 2007, pp. 18-48.

International Search Report and Written Opinion Dated Dec. 16, 2008; cited in PCT/US2008/072169.

International Search Report and Written Opinion dated Sep. 12, 2009; cited in related application PCT/US2009/031061.

Office Action mailed Jun. 9, 2011 in co-pending U.S. Appl. No. 12/276,518.

Amendment filed on Sep. 7, 2011 in co-pending U.S. Appl. No. 12/276,518.

* cited by examiner

PILOT-BASED TWO-DIMENSIONAL CHANNEL ESTIMATION

CROSS REFERENCE TO RELATED APPLICATIONS

This application claims priority to U.S. Provisional Patent Application No. 60/954,753, filed Aug. 8, 2007, the entirety of which is incorporated herein by reference.

BACKGROUND

Wideband wireless communication systems operate in a variety of environments. In one environment, a stationary base station (BS) acts as data communication access point for mobile stations (MS's). Each device on the wireless communication link employs a channel estimation algorithm to compensate for environmental effects such as multipath fading and/or Doppler delay.

To improve coherent detection of the channel information, some high data rate communication systems insert pilot signals into the data traffic streams for channel tracking or estimation. Generally, the channel time response or frequency response can be estimated based on the pilots if a sufficient number of pilot signals are used.

However, in certain practical applications, such as those in which transmissions are made in a small burst size or with dedicated pilots, there are a limited number of pilots available for channel estimation. Consequently, channel estimation techniques that require more pilots or training sequences are not effective for these kinds of applications. The distribution of pilots in a small burst may not satisfy the requirement for other widely used channel estimation techniques.

A technique is needed to estimate channel information based on channel information at pilot signals in a small or short transmission burst.

DESCRIPTION OF EXAMPLE EMBODIMENTS

Overview

Techniques are provided herein to estimate channel information based a received burst that is comprises of consecutive transmissions. Each transmission comprises a plurality of data subcarriers and a plurality of pilot subcarriers on a radio frequency (RF) channel, wherein locations of the pilot subcarriers in the consecutive transmissions are different. Channel information at the pilot subcarriers is computed for each transmission in the burst. A time variation parameter and a frequency variation parameter of the channel for the burst are computed using the channel information at the pilot subcarriers for the transmissions in the burst. Channel information for at least one data subcarrier of a transmission in the burst is computed by interpolation and/or extrapolation of the channel information at the pilot subcarriers using the time variation parameter and the frequency variation parameter. Based on the estimated channel information at the pilot and the at least one data subcarrier, the channel information of the remaining data subcarriers is computed using interpolation and/or extrapolation.

Figure 1:
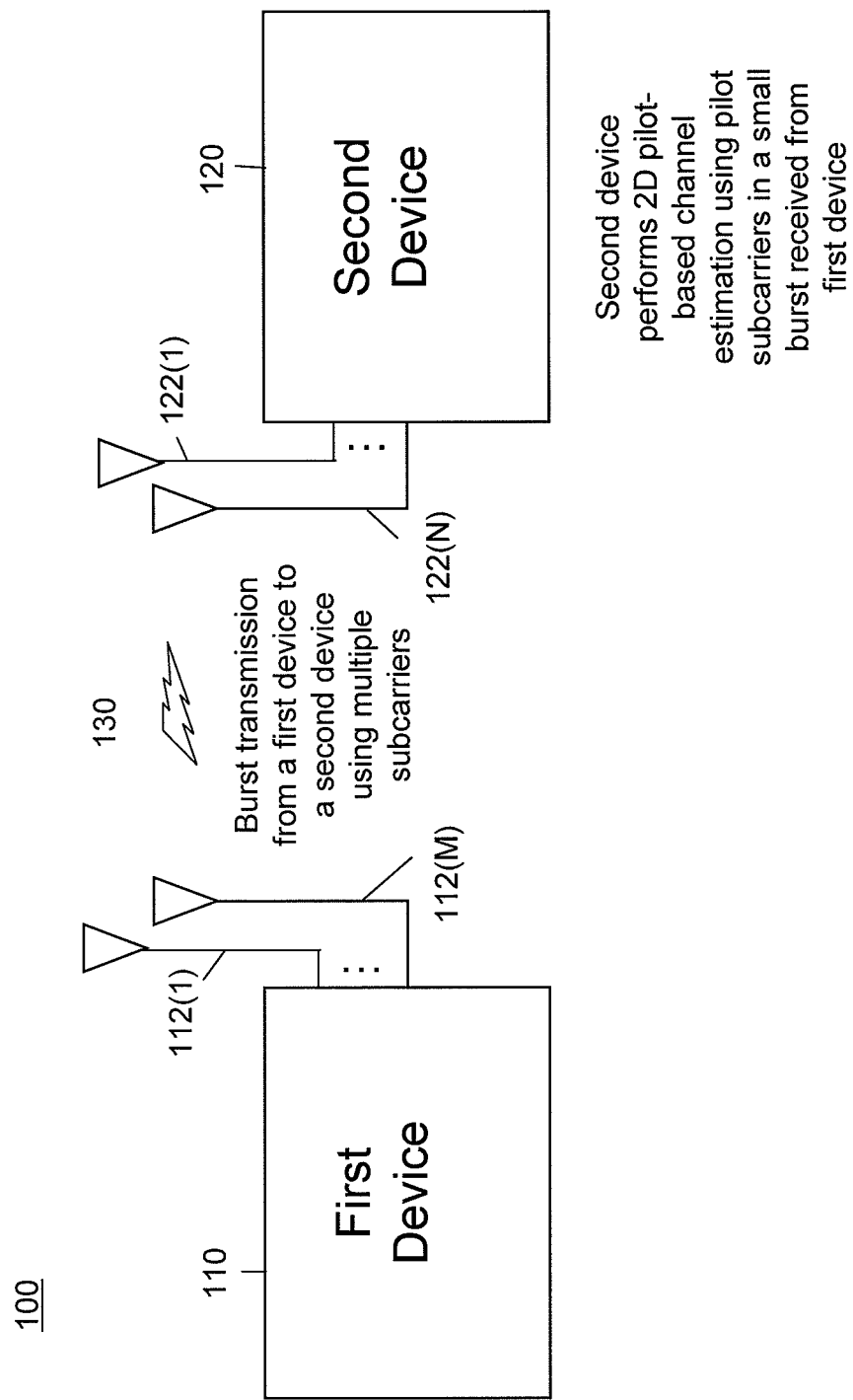
FIG. 1 is an example of a block diagram of a wireless communication environment in which a first communication device transmits a small or short burst to a second device, and from which the second device derives channel information.

Referring first to FIG. 1, a wireless radio communication environment is shown at reference numeral 100 and comprises a first communication device 110, and a second communication device 120. The first device 110 may connect to wired data network facilities (not shown) and in that sense serve as a gateway or access point through which the second device 120 has access to those data network facilities. The first device 110 comprises one or more antennas 112(1)-122(M) and the second device 120 comprises one or more antennas 122(1)-122(N).

In this example, the first communication device 110, such as a base station (BS), transmits a small burst 130 to the second communication device 120, e.g., a specific or particular mobile station (MS). The second device 120 implements the pilot-based two-dimensional (2D) channel estimation process described herein. The term "downlink" is used herein to refer to transmissions from the first communication device 110 to the second communication device 120. While FIG. 1 and the following description refers to the second device 120 performing the pilot-based 2D channel estimation process based on transmissions received from the first device 110, it is to be understood that the first device 110 may perform the pilot-based 2D channel estimation process based on transmissions it receives from the second device 120. The pilot-based 2D channel estimation process described herein has relatively low complexity and can significantly improve the process of channel detection even in the presence of multipath fading and time varying conditions. The channel information produced by the pilot-based 2D channel estimation process may be used to compute parameters, such as beamforming or pre-coding weights that are used for transmitting signals back to the other device.

Figure 2:
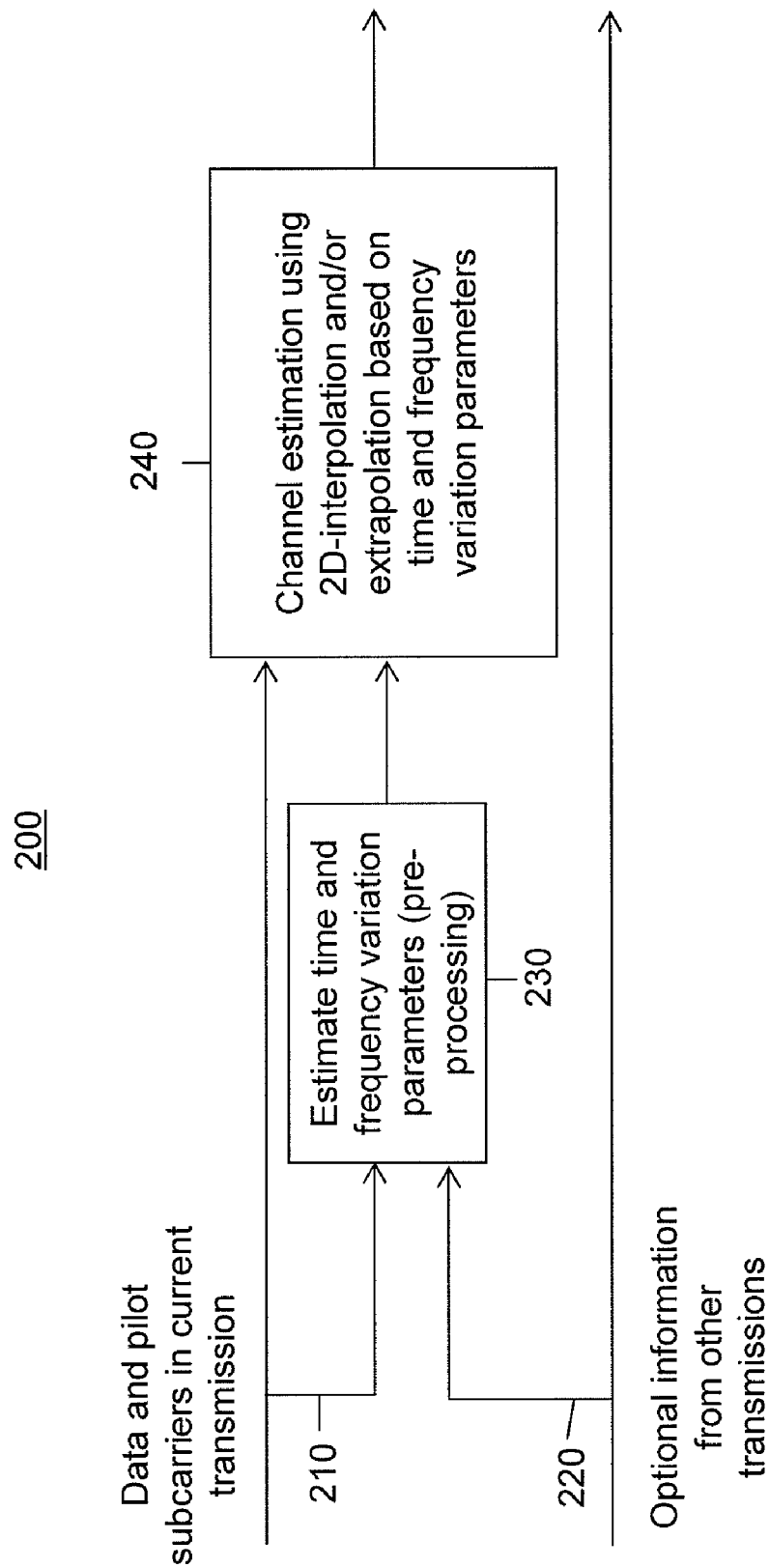
FIG. 2 is an example of a flow diagram of a pilot-based two-dimensional channel estimation process.

Turning to FIG. 2, a general flow diagram is shown at 200 for the pilot-based 2D channel estimation process. First, at 210, the data and pilot subcarriers for a current transmission are extracted. Information from previously received transmissions at 220 may be used together with the data and pilot subcarrier information from a current transmission to pre-process and estimate time and frequency variation parameters of the channel at 230. The transmissions may be sent in accordance with any now known or hereinafter developed communication standard, such as the IEEE 802.16-2005 (or 2007) communication standard known under the commercial brand WiMAX™.

At 240, channel information at data subcarriers in a transmission are estimated by 2D interpolation and/or extrapolation using channel information at the pilot subcarriers and the estimated time and frequency variation parameters determined at 230. The techniques described herein are useful in estimating channel information in a small burst that comprises at least two transmissions (that may or may not be consecutively transmitted), such as in a cluster defined under the WiMAX™ communication standard. However, these techniques are applicable to a variety of communication techniques, such as code division multiple access (CDMA), frequency division multiple access (FDMA), frequency division duplex (FDD), and time division duplex (TDD), and may be used for wired communication applications as well as wireless communication.

Figure 3:
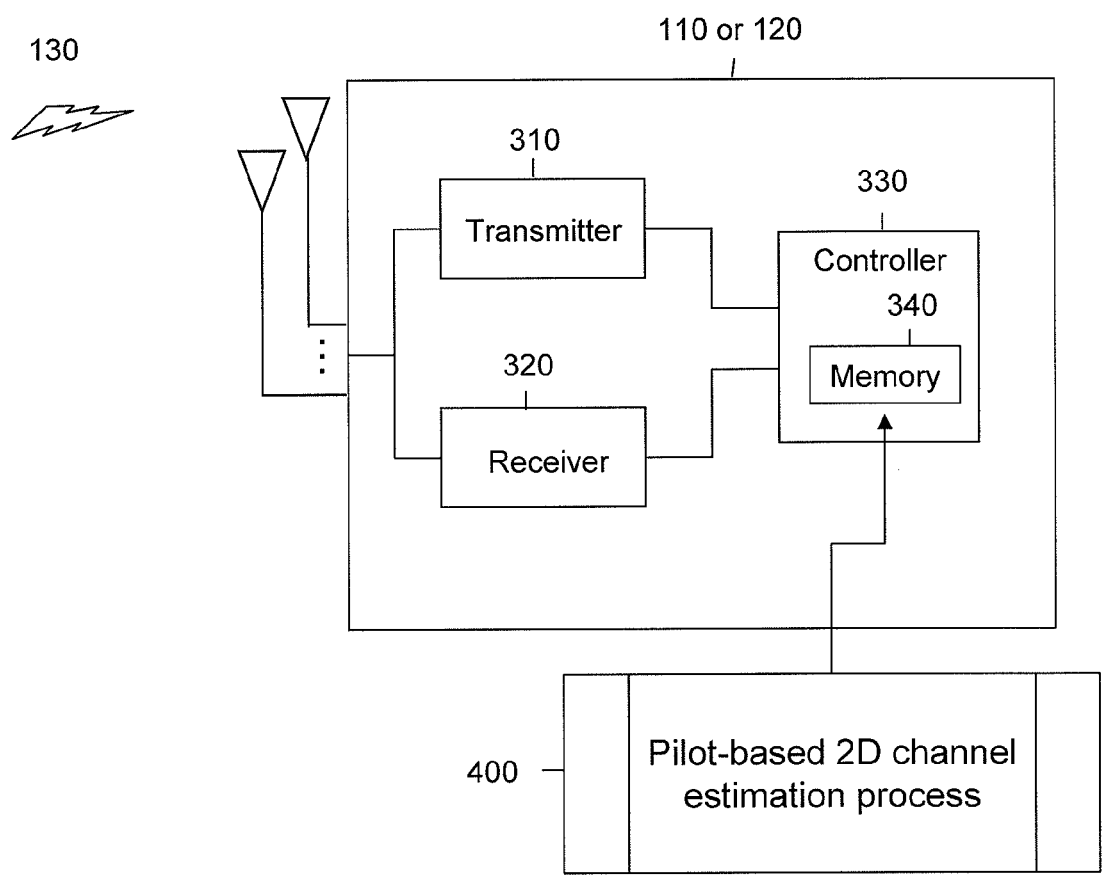
FIG. 3 is an example of a block diagram of a communication device that is configured to perform the pilot-based two-dimensional channel estimation process.

Turning to FIG. 3, an example of a block diagram of a communication device 110 or 120 configured to perform the pilot-based 2D channel estimation process is shown. The device 110 or 120 comprises a transmitter 310, a receiver 320, and a controller 330 with a memory 340 for storage of data and instructions. The controller 330 may be configured to perform a pilot-based 2D channel estimation process shown at 400, either by way of instructions stored in the memory 340 or by way of separate programmable logic or fixed logic. The memory 340 may be separate or part of the controller 330.

The pilot-based 2D channel estimation process 400 may be implemented by logic encoded in one or more tangible media (e.g., embedded logic such as an application specific integrated circuit, digital signal processor instructions, software that is executed by a processor, etc.), wherein the memory 340 stores data used for the computations described herein (and/or to store software or processor instructions that are executed to carry out the computations described herein). To this end, logic is provided in any of these forms to execute the pilot-based 2D channel estimation process 400. The process 400 is described in more detail hereinafter in conjunction with FIG. 4, in conjunction with FIGS. 5 and 6.

Figure 4:
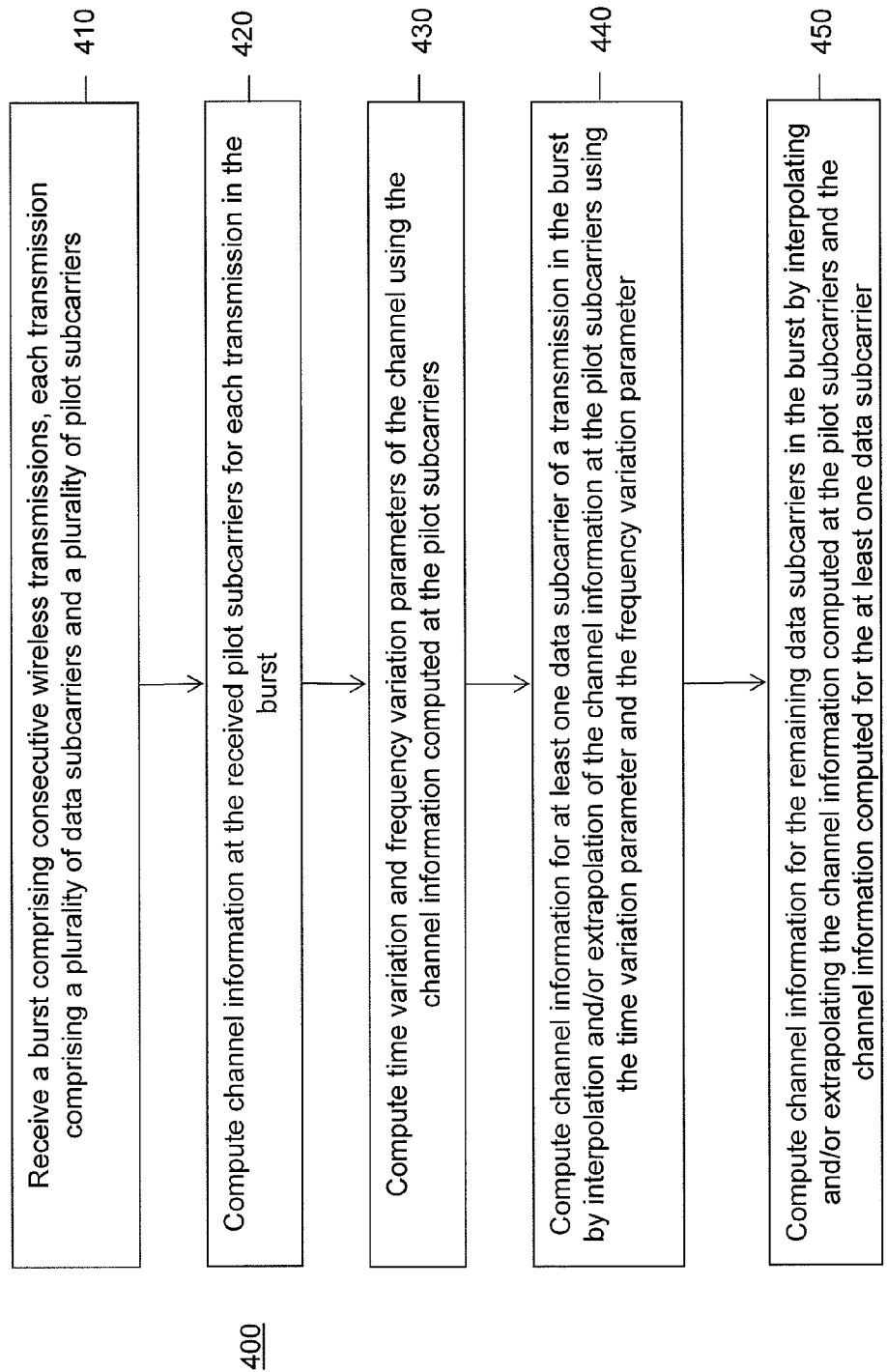
FIG. 4 is an example of a detailed flow chart for the pilot-based two-dimensional channel estimation process.
Figure 5:
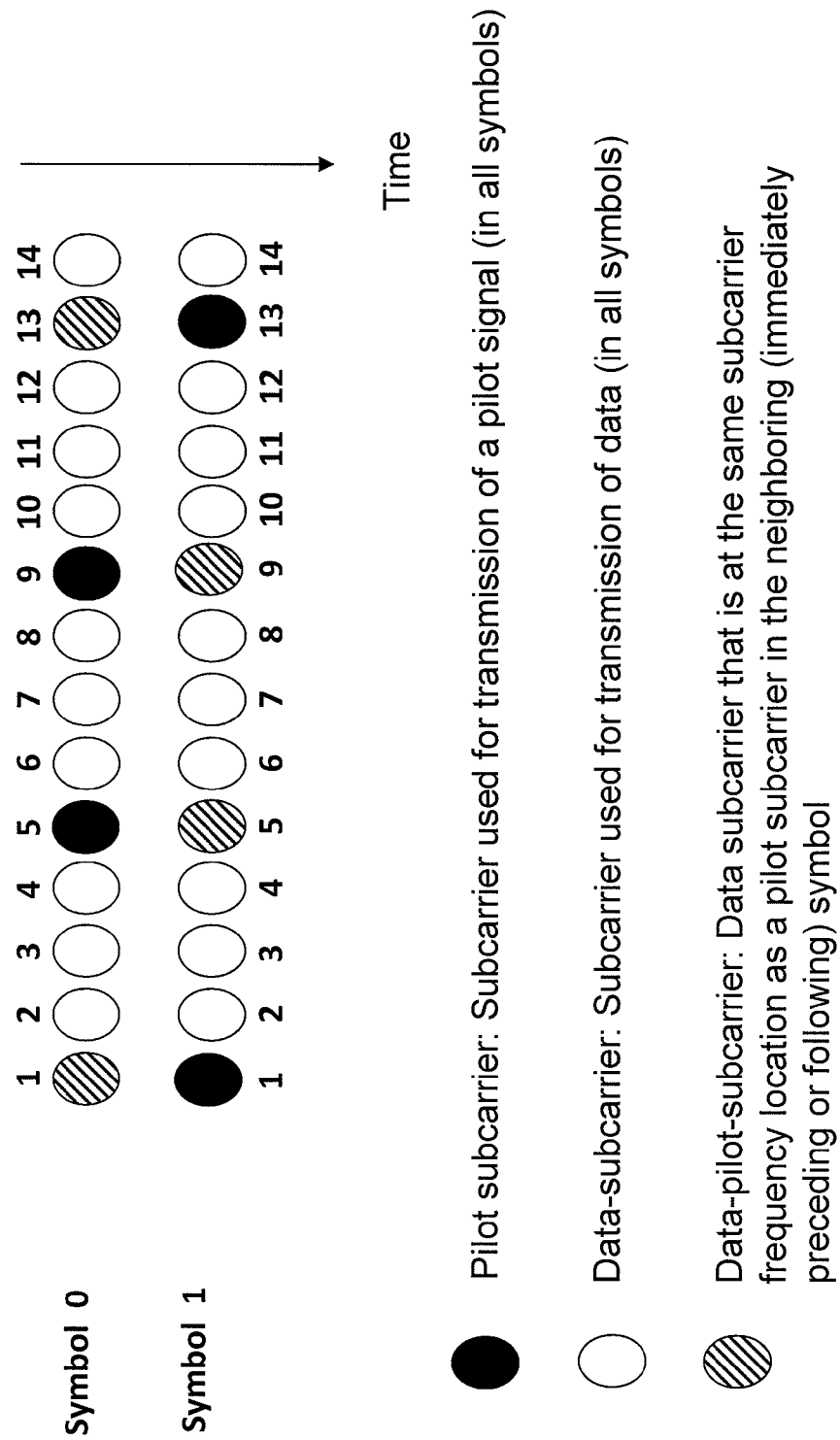
FIG. 5 is diagram illustrating an example of a grouping of subcarriers in one type of orthogonal frequency division multiple access (OFDMA) system for which the pilot-based two-dimensional channel estimation process may be employed.

Turning to FIG. 4, the pilot-based 2D channel estimation process 400 is now described. At 410 a burst 130 is received by a communication device, e.g., device 110 receives the burst from device 120 or device 120 receives the burst from device 110. The burst comprises consecutive (in time) transmissions, and in one slot of two consecutive symbols wirelessly transmitted from one device to the other. Thus, a symbol is an example of an instantaneous "transmission". For example, as shown in FIG. 5, a burst may comprise two consecutive OFDMA symbols (symbol 0 and symbol 1) that are formatted in accordance with the IEEE 802.16 communication standard for use in a WiMAX communication system. Symbol 0 comprises pilot subcarriers for estimation and synchronization purposes at subcarrier frequency locations 5 and 9. The remaining subcarriers 1-4, 6-8, and 10-14 in symbol 0 are allocated as data subcarriers. Similarly, symbol 1 comprises pilot subcarriers at subcarrier frequency locations 1 and 13, and the remaining subcarriers 2-12 and 14 are allocated as data subcarriers. Thus, the locations of the pilot subcarriers in consecutive transmissions are different.

The following terminology is adopted for purposes of simplifying the description.

A "pilot-subcarrier" is a subcarrier for transmission of a pilot signal.

A "data-subcarrier" is a subcarrier for transmission of data.

A "data-pilot-subcarrier" is a data subcarrier that is at the same subcarrier frequency location as a pilot subcarrier in the neighboring (immediately preceding or following) symbol.

Thus, in the example shown in FIG. 5, the subcarriers 1 and 13 in symbol 0 and subcarriers 5 and 9 in symbol 1 are data-pilot-subcarriers because there are pilot subcarriers at subcarriers 1 and 13 in symbol 1 and at subcarriers 5 and 9 of symbol 0.

At 420, the channel information at the pilot subcarriers for each transmission in a burst is computed. For example, as shown in FIG. 5, the channel information is computed from the received signals at pilot subcarriers 1 and 13 of symbol 0 and at pilot subcarriers 5 and 9 of symbol 1. The following notation is adopted to facilitate understanding of the following description:

$x_{a,b}$ represents the transmitted pilot signal of symbol "a" subcarrier "b," and the transmitted pilot signal is known a priori by the receiving device.

$y_{a,b}$ represents the received signal of symbol "a" subcarrier "b".

$\hat{h}_{a,b}$ represents the computed estimate of the channel information of symbol "a" subcarrier "b".

Accordingly, the channel information at the pilot subcarriers for symbols 0 and 1 shown in FIG. 5 are computed by the computations:

$$\hat{h}_{0,5} = \frac{y_{0,5}}{x_{0,5}}, \hat{h}_{0,9} = \frac{y_{0,9}}{x_{0,9}}, \hat{h}_{1,1} = \frac{y_{1,1}}{x_{1,1}}, \text{ and } \hat{h}_{1,13} = \frac{y_{1,13}}{x_{1,13}},$$

where $x_{0,5}$, $x_{0,9}$, $x_{1,1}$ and $x_{1,13}$ are the transmit signals at the corresponding pilot subcarriers.

At 430, a time variation parameter (scale), $s_t$, and a frequency variation parameter, $s_f$, are computed for the burst using the channel information at the pilot subcarriers, e.g., channel information, $\hat{h}_{0,5}$, $\hat{h}_{0,9}$, $\hat{h}_{1,1}$, and $\hat{h}_{1,13}$. In one embodiment, the time variation parameter, $s_t$, is computed as the mean of the channel information at the pilot subcarriers divided by the sum of the differences of the channel information at the pilot subcarriers closest in frequency, such that:

$$s_t = \frac{\text{mean}(|\hat{h}_{0,5}|, |\hat{h}_{0,9}|, |\hat{h}_{1,1}|, |\hat{h}_{1,13}|)}{|\hat{h}_{1,1} - \hat{h}_{0,5}| + |\hat{h}_{1,13} - \hat{h}_{0,9}|}$$

Thus, the time variation parameter, $s_t$, represents the time variation of the channel (i.e., the degree to which the channel varies over time) for the burst and is based on the channel information computed at the different pilot subcarriers which are closest in frequency to each other but are in two different symbols.

Similarly, in one embodiment, the frequency variation parameter, $s_f$, is computed as the mean of the channel information at the pilot subcarriers divided by a weighted sum of the differences of the channel information at the pilot subcarriers closest in time, such that:

$$s_{f0} = \frac{\text{mean}(|\hat{h}_{0,5}|, |\hat{h}_{0,9}|, |\hat{h}_{1,1}|, |\hat{h}_{1,13}|)}{2(|\hat{h}_{1,1} - \hat{h}_{1,13}| + 2|\hat{h}_{0,5} - \hat{h}_{0,9}|)}$$

$$s_f = \begin{cases} s_{f0} & \text{if } s_{f0} \geq 0.2 \\ s_{f0}^2 & \text{else} \end{cases}$$

Thus, the frequency variation parameter, $s_f$, represents the frequency variation of the channel (degree to which the channel varies over frequency, also known as frequency selectivity) for the burst and is based on the channel information at the pilot subcarriers which are closest in time (within their respective symbol) to each other.

Furthermore, the computations for the time variation parameter and the frequency variation parameter described above are based on the locations in time and frequency of the data subcarriers relative to the locations in time and frequency of the pilot subcarriers such that the frequency variation parameter is larger when the channel exhibits lower frequency variations and the time variation parameter is larger when the channel exhibits lower time variations.

Next, at 440, the channel information is computed for at least one data subcarrier in one of the transmissions (symbols) of a burst by interpolating and/or extrapolating the channel information at the pilot subcarriers using the time variation and frequency variation parameters. This is the so-called 2D interpolation/extrapolation computation. The at least one data subcarrier for which the channel information is computed at 440 may be a data-pilot-subcarrier. In general, the at least one subcarrier may be a data-pilot-subcarrier as defined above, or at a data subcarrier that is at a frequency location in one transmission in the burst that is close to, (but not necessarily at the same as) a frequency location of a pilot subcarrier in another transmission in the burst.

Figure 6:
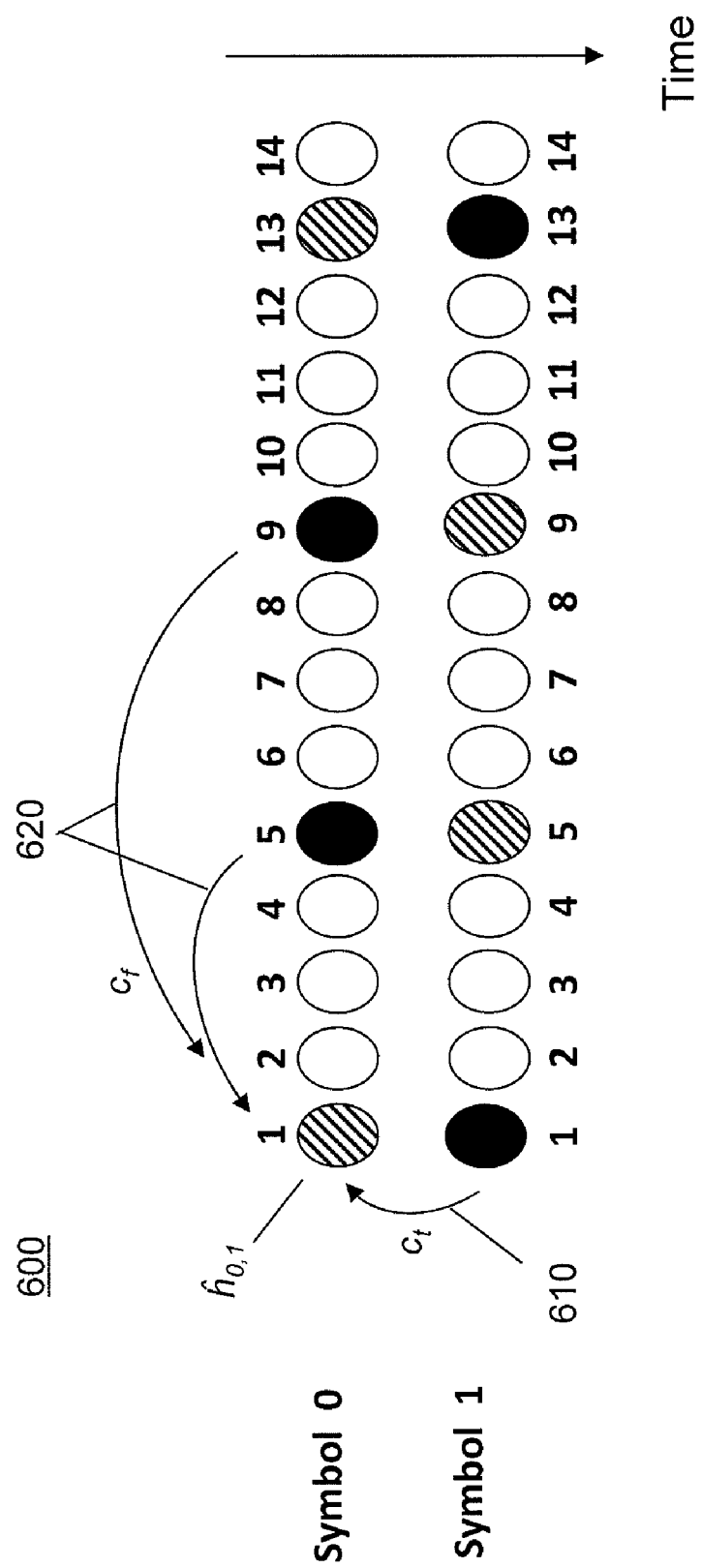
FIG. 6 is a diagram illustrating an example of computing channel information for at least one data subcarrier based on channel information at neighboring pilot subcarriers as part of the pilot-based two-dimensional channel estimation process.

Referring to FIG. 6, an example of the computation for estimating channel information at a data-pilot-subcarrier is shown. In this example, the computation of the channel information at subcarrier 1 of symbol 0, $\hat{h}_{0,1}$, is described. In the example of two symbol burst shown in FIG. 6, one data-pilot-subcarrier of symbol 0 is data-pilot-subcarrier at subcarrier 1 because there is a pilot subcarrier at subcarrier 1 of the neighboring symbol, e.g., symbol 1.

First and second coefficients $c_f$ and $c_t$, respectively, are computed from the time variation parameter and the frequency variation parameter. In one embodiment, the aforementioned first coefficient $c_f$ is computed as a ratio of the frequency variation parameter $s_f$ to a sum of the time variation parameter and frequency variation parameter ($s_t+s_f$), i.e., $s_f/(s_t+s_f)$. Similarly, the second coefficient $c_t$ is computed as a ratio the time variation parameter $s_t$ to a sum of the time variation parameter and frequency variation parameter ($s_t+s_f$), i.e., $s_t/(s_t+s_f)$.

Reference numeral 600 indicates the channel information estimation at the data-pilot-subcarrier 1 of symbol 0 is computed using interpolation and/or extrapolation from the estimated channel information of the neighbor pilot subcarriers, i.e., pilot subcarrier 1 of symbol 1 (indicated at reference numeral 610) and pilot subcarriers 5 and 9 of symbol 0 (indicated at reference numeral 620). FIG. 6 further shows that the contribution weight or scale in time and frequency $c_t$ and $c_f$, respectively, is applied to a pilot subcarrier with respect to a data-pilot-subcarrier for which the channel information is computed using an interpolation/extrapolation operation. Specifically, reference numeral 610 shows that the second coefficient $c_t$ is used when deriving the contribution of the channel information at data-pilot-subcarrier 1 of symbol 0 from the channel information at pilot subcarrier 1 of symbol 1 since there is a time direction/domain variation between transmission of symbol 0 and transmission of symbol 1 (symbol 1 is transmitted later in time than symbol 0). Reference numeral 620 shows that the first coefficient $c_f$ is used when deriving the contribution of the channel information at data-pilot-subcarrier 1 of symbol from the channel information at pilot subcarriers 5 and 9 in symbol 0 since the pilot subcarriers 5 and 9 in symbol are transmitted at the same time as subcarrier 1 in symbol 1, but at different subcarrier frequencies. Set forth below are equations (1)-(4) that mathematically represent the computations that may be made to compute the channel information at data subcarriers 5 and 9 in symbol 0 and data subcarriers 1 and 13 in symbol 1 using the first and second coefficients described above.

$$\hat{h}_{0,1} = \frac{s_t}{s_t+s_f}\hat{h}_{1,1} + \frac{s_f}{s_t+s_f}(2\hat{h}_{0,5} - \hat{h}_{0,9}) \quad (1)$$

$$\hat{h}_{0,13} = \frac{s_t}{s_t+s_f}\hat{h}_{1,13} + \frac{s_f}{s_t+s_f}(2\hat{h}_{0,9} - \hat{h}_{0,5}) \quad (2)$$

$$\hat{h}_{1,5} = \frac{s_t}{s_t+s_f}\hat{h}_{0,5} + \frac{s_f}{s_t+s_f}(2\hat{h}_{1,1} + \hat{h}_{1,13})/3 \quad (3)$$

$$\hat{h}_{1,9} = \frac{s_t}{s_t+s_f}\hat{h}_{0,9} + \frac{s_f}{s_t+s_f}(\hat{h}_{1,1} + 2\hat{h}_{1,13})/3 \quad (4)$$

Equation (1) corresponds to the channel estimation computation described above in conjunction with FIG. 6. FIG. 6 also illustrates that the channel information of data-pilot-subcarrier is interpolated and/or extrapolated by using the channel information of its neighbor pilot subcarriers. The time direction component and frequency direction component in the interpolation/extrapolation operation are $c_t$ and $c_f$ respectively. That is, symbol 0 has pilots at subcarriers 5 and 9 and channel information is computed (at 440 in FIG. 4) for data-pilot-subcarriers 5 and 9 in symbol 1. Likewise, symbol 1 has pilots at subcarriers 1 and 13 and channel information is computed (at 440 in FIG. 4) for data-pilot-subcarriers 1 and 13 in symbol 0. Moreover, the channel computation function at 440, as reflected by equations (1)-(4) may be summarized as the follows: the channel information of a data-pilot-subcarrier is estimated with 2D-interpolation and/or extrapolation based on the estimated channel information of its neighboring pilot subcarriers. The scaling factors of the interpolation operation in time and frequency are adjusted by $c_t$ and $c_f$.

Once the channel information at data-pilot-subcarriers is estimated, then at 450, the channel information at the remaining data subcarriers for each transmission can be estimated using frequency-based interpolation and/or extrapolation. Thus, in the example shown in FIG. 6, the channel information at subcarriers 2-4, 6-8, 10-12 and 14 in symbols 0 and symbol 1 are computed from channel information for the pilot subcarriers and the channel information for data-pilot-subcarrier computed at 440, e.g., data subcarriers 1 and 13 in symbol 0 and data subcarriers 5 and 9 in symbol 1 denoted $\hat{h}_{0,1}, \hat{h}_{0,5}, \hat{h}_{0,9}, \hat{h}_{0,13}$ and $\hat{h}_{1,1}, \hat{h}_{1,5}, \hat{h}_{1,9}, \hat{h}_{1,13}$.

There are numerous advantages to the pilot-based 2D channel estimation process described herein. Compared to other methods such as those that involve regular training using uniformly distributed pilot subcarriers, this present technique is suitable to any distribution of pilot subcarriers that available even in only one time slot or transmission. In this sense, the present technique is a generic pilot based channel estimation technique that is applicable to any pilot-based channel estimation, with regular/uniform or irregular/non-uniform distributed pilots. This includes communication systems that employ any FDMA systems, time division multiple access (TDMA) systems, and any combination thereof, whether synchronized or unsynchronized, as well as FDD or time division duplex TDD systems.

In addition, the present technique does not require a large number of pilot subcarriers or a channel statistic, and furthermore is useful in situations where one or both of the communication devices on the link are mobile or stationary.

Although the apparatus, system, and method for channel estimation using 2D interpolation within a single cluster techniques are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for the techniques, as set forth in the following claims.

What is claimed is:

1. A method comprising:
    receiving at a communication device a burst comprising consecutive transmissions, each transmission comprising a plurality of data subcarriers and a plurality of pilot subcarriers on a radio frequency (RF) channel, wherein locations of the pilot subcarriers in the consecutive transmissions are different;
    computing channel information at the pilot subcarriers for each transmission in the burst;
    computing a time variation parameter and a frequency variation parameter of the channel for the burst using the channel information at the pilot subcarriers for the transmissions in the burst; and
    computing channel information for at least one data subcarrier of a transmission in the burst by interpolation and/or extrapolation of the channel information at the pilot subcarriers using the time variation parameter and the frequency variation parameter.

2. The method of claim 1, and further comprising computing channel information at remaining data subcarriers for each transmission in the burst by interpolation and/or extrapolation of the channel information computed for the at least one data subcarrier and the channel information of the pilot subcarriers.

3. The method of claim 2, wherein computing the channel information for at least one data subcarrier comprises computing the channel information for at least one data subcarrier in each of the transmissions in the burst.

4. The method of claim 1, wherein the at least one data subcarrier is at a frequency location of one transmission in the burst that is the same as a frequency location of a pilot subcarrier in another transmission in the burst.

5. The method of claim 1, wherein computing the time variation parameter is based on the channel information computed at different pilot subcarriers in different transmissions of a burst and thus representing the degree to which the channel varies over time, and wherein computing the frequency variation parameters is based on the channel information computed at different pilot subcarriers within a transmission of a burst and thus representing the degree to which the channel varies with frequency.

6. The method of claim 5, wherein computing the time variation parameter and the frequency variation parameter is based on the locations in time and frequency of the data subcarriers relative to the locations in time and frequency of the pilot subcarriers such that the frequency variation parameter is larger when the channel exhibits lower frequency variations and the time variation parameter is larger when the channel exhibits lower time variations.

7. The method of claim 6, wherein computing the channel information for the at least one data subcarrier comprises computing first and second coefficients based on the time variation parameter and the frequency variation parameter.

8. The method of claim 7, wherein computing the first coefficient comprises computing a ratio of the time variation parameter to a sum of the time variation parameter and the frequency variation parameter, and computing the second coefficient comprises computing a ratio of the frequency variation parameter to the sum.

9. The method of claim 7, wherein computing channel information at the at least one data subcarrier comprises:
    multiplying the first coefficient by the channel information of a pilot subcarrier that is closest in frequency to the at least one data subcarrier;
    multiplying the second coefficient by a difference between the channel information of two pilot subcarriers closest in time to the at least one data subcarrier; and
    summing the results obtained from said multiplying of the first coefficient and said multiplying of the second coefficient to produce the channel information at the data subcarrier.

10. The method of claim 1, wherein computing the time variation parameter comprises:
    averaging the channel information at the pilot subcarriers within the burst;
    summing differences of the channel information at the pilot subcarriers of different transmissions; and
    dividing the average by the summed differences.

11. The method of claim 1, wherein computing the frequency variation parameter comprises:
    averaging channel information at the pilot subcarriers;
    summing differences of the channel information at the pilot subcarriers of the same transmission; and
    dividing the average by the summed differences.

12. The method of claim 1, wherein the burst comprises at least two consecutive symbol transmissions.

13. An apparatus comprising:
    a receiver that receives a burst comprising transmissions sent from another communication apparatus, each transmission comprising a plurality of data subcarriers and a plurality of pilot subcarriers on a radio frequency (RF) channel, wherein locations of the pilot subcarriers in the consecutive transmissions are different;
    a controller coupled to the receiver and configured to:
        compute channel information at the pilot subcarriers for each transmission in the burst;
        compute a time variation parameter and a frequency variation parameter of the channel for the burst using the channel information at the pilot subcarriers for the transmissions in the burst; and
        compute channel information for at least one data subcarrier of a transmission in the burst by interpolation and/or extrapolation of the channel information at the pilot subcarriers using the time variation parameter and the frequency variation parameter.

14. The apparatus of claim 13, wherein the controller is further configured to compute channel information at remaining data subcarriers for each transmission in the burst by interpolation and/or extrapolation of the channel information computed for the at least one data subcarrier and the channel information of the pilot subcarriers.

15. The apparatus of claim 13, wherein the controller is configured to compute the channel information for the at least one data subcarrier at a frequency location of one transmission in the burst that is the same as a frequency location of a pilot subcarrier in another transmission in the burst.

16. The apparatus of claim 13, wherein the controller is configured to compute the time variation parameter based on the channel information computed at different pilot subcarriers in different transmissions of a burst and thus representing the degree to which the channel varies over time, and to compute the frequency variation parameters based on the channel information computed at different pilot subcarriers within a transmission of a burst and thus representing the degree to which the channel varies with frequency.

17. One or more tangible processor readable storage media storing instructions for execution that, when executed by a processor, is operable to:

for received transmissions each of which comprises a plurality of data subcarriers and a plurality of pilot subcarriers on a radio frequency channel, wherein the locations of the pilot subcarriers in the consecutive transmission are different, computing channel information at a plurality of pilot subcarriers in each transmission of a burst;

computing a time variation parameter and a frequency variation parameter of the channel for the burst using the channel information at the pilot subcarriers for the transmissions in the burst; and computing channel information for data-pilot-subcarrier of a transmission in the burst by interpolation and/or extrapolation of the channel information at the pilot subcarriers using the time variation parameter and the frequency variation parameter.

18. The processor readable storage media of claim 17, and further comprising instructions that are operable to compute channel information at remaining data subcarriers for each transmission in the burst by interpolation and/or extrapolation of the channel information computed for the at least one data subcarrier and the channel information of the pilot subcarriers.

19. The processor readable storage media of claim 17, wherein the instructions that are operable to compute the channel information for the at least one data subcarrier comprise instructions operable to compute the channel information for a data subcarrier that is at a frequency location of one transmission in the burst that is the same as a frequency location of a pilot subcarrier in another transmission in the burst.

20. The processor readable storage media of claim 17, wherein the instructions that are operable to compute the time variation parameter and the frequency variation parameter comprise instructions operable to compute the time variation parameter based on the channel information computed at different pilot subcarriers in different transmissions of a burst and thus representing the degree to which the channel varies over time, and to compute the frequency variation parameters based on the channel information computed at different pilot subcarriers within a transmission of a burst and thus representing the degree to which the channel varies with frequency.

* * * * *